United States Patent
Berry

(10) Patent No.: US 8,447,239 B1
(45) Date of Patent: May 21, 2013

(54) SYSTEM AND METHOD FOR MOBILE DATA EXPANSION

(71) Applicant: Neutronic Perpetual Innovations, LLC, Irving, TX (US)

(72) Inventor: Terrance Berry, Irving, TX (US)

(73) Assignee: Neutronic Perpetual Innovations, LLC, Irvine, TX (US)

(*) Notice: Subject to any disclaimer, the term of this patent is extended or adjusted under 35 U.S.C. 154(b) by 0 days.

(21) Appl. No.: 13/646,537

(22) Filed: Oct. 5, 2012

Related U.S. Application Data

(60) Provisional application No. 61/668,867, filed on Jul. 6, 2012.

(51) Int. Cl.
   *H04B 1/38* (2006.01)
   *H03C 1/52* (2006.01)
   *H04M 1/00* (2006.01)

(52) U.S. Cl.
   USPC .............. 455/73; 455/106; 455/572; 455/573

(58) Field of Classification Search
   None
   See application file for complete search history.

(56) References Cited

U.S. PATENT DOCUMENTS

| | | | |
|---|---|---|---|
| 7,499,429 B2 * | 3/2009 | Dawidowsky et al. | 370/331 |
| 2003/0058819 A1 * | 3/2003 | Dawidowsky et al. | 370/331 |
| 2007/0167174 A1 * | 7/2007 | Halcrow et al. | 455/456.2 |
| 2009/0257564 A1 * | 10/2009 | Kito et al. | 378/206 |
| 2010/0203892 A1 * | 8/2010 | Nagaraja et al. | 455/437 |

* cited by examiner

*Primary Examiner* — Yuwen Pan
*Assistant Examiner* — Ayodeji Ayotunde

(57) ABSTRACT

A data expansion system that provides continuum of discrete wireless small cell coverage areas for mobile terminals includes a set of roadway reflectors configured to provide wireless broadband data services to a mobile terminal. Each reflector includes processing circuitry configured to establish communications between the mobile terminal and a backhaul network. Each reflector includes a wireless transceiver configured to transmit and receive data. Each reflector includes a power source that converts solar energy into electricity. Each reflector includes a housing configured to contain the processing circuitry, the transceiver, and the power source. The housing has a raised reflective surface.

20 Claims, 8 Drawing Sheets

SYSTEM AND METHOD FOR MOBILE DATA EXPANSION

CROSS-REFERENCE TO RELATED APPLICATIONS AND CLAIMS OF PRIORITY

The present application hereby claims priority under 35 U.S.C. §119(e) to U.S. Provisional Patent No. 61/668,867, entitled "SYSTEM AND METHOD FOR MOBILE DATA EXPANSION," filed on Jul. 6, 2012. The content of the above-identified patent document is incorporated herein by reference.

TECHNICAL FIELD

The present application relates generally to mobile broadband data services, and more specifically to discrete WiFi hotspots for mobile devices.

BACKGROUND

Wireless data communications are increasing in demand and popularity. Mobile devices use cellular data networks or small wireless fidelity (WiFi) networks (WiFi hotspots) to access broadband data services for mobile devices. While cellular data networks provide a wider coverage, WiFi hotspots are capable of higher data transfer rates and lower power usage at a lower cost. However, WiFi hotspots provide a limited coverage area inhibiting use when the user is moving between locations.

SUMMARY

A data expansion reflector is provided. The data expansion reflector includes a wireless transceiver configured to transmit and receive data. The data expansion reflector also includes processing circuitry configured to couple to a backhaul network and at least one mobile device. The processing circuitry is further configured to communicate information between the at least one mobile terminal and the backhaul network. The data expansion reflector also includes a power source that includes an electricity generator. The electricity generator converts solar energy into electricity. The data expansion reflector also includes a housing configured to contain the processing circuitry, the transceiver, and the power source. The housing includes a raised reflective surface.

A system for providing broadband data services to at least one mobile terminal is provided. The system includes a first set of data expansion reflectors. The first set of data expansion reflectors includes a plurality of data expansion reflectors configured to couple to a backhaul network. Each data expansion includes a wireless signal transceiver configured to transmit and receive data. Each data expansion reflector also includes processing circuitry configured to communicate with a backhaul network and at least one mobile terminal via the transceiver. Each data expansion reflector also includes a power source configured to provide electrical energy to the processing circuitry and the transceiver. Each data expansion reflector also includes a housing comprising a raised reflective surface, the housing is configured to contain the processing circuitry, power source and wireless signal transceiver.

A method for data expansion is provided. The method includes coupling a data expansion unit to a backhaul network. The method also includes coupling at least one mobile terminal to the data expansion unit. The method further includes communicating, by the data expansion unit, information between the at least one mobile terminal and the backhaul network. The data expansion unit comprising a surface reflector.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller might be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Figure 1:
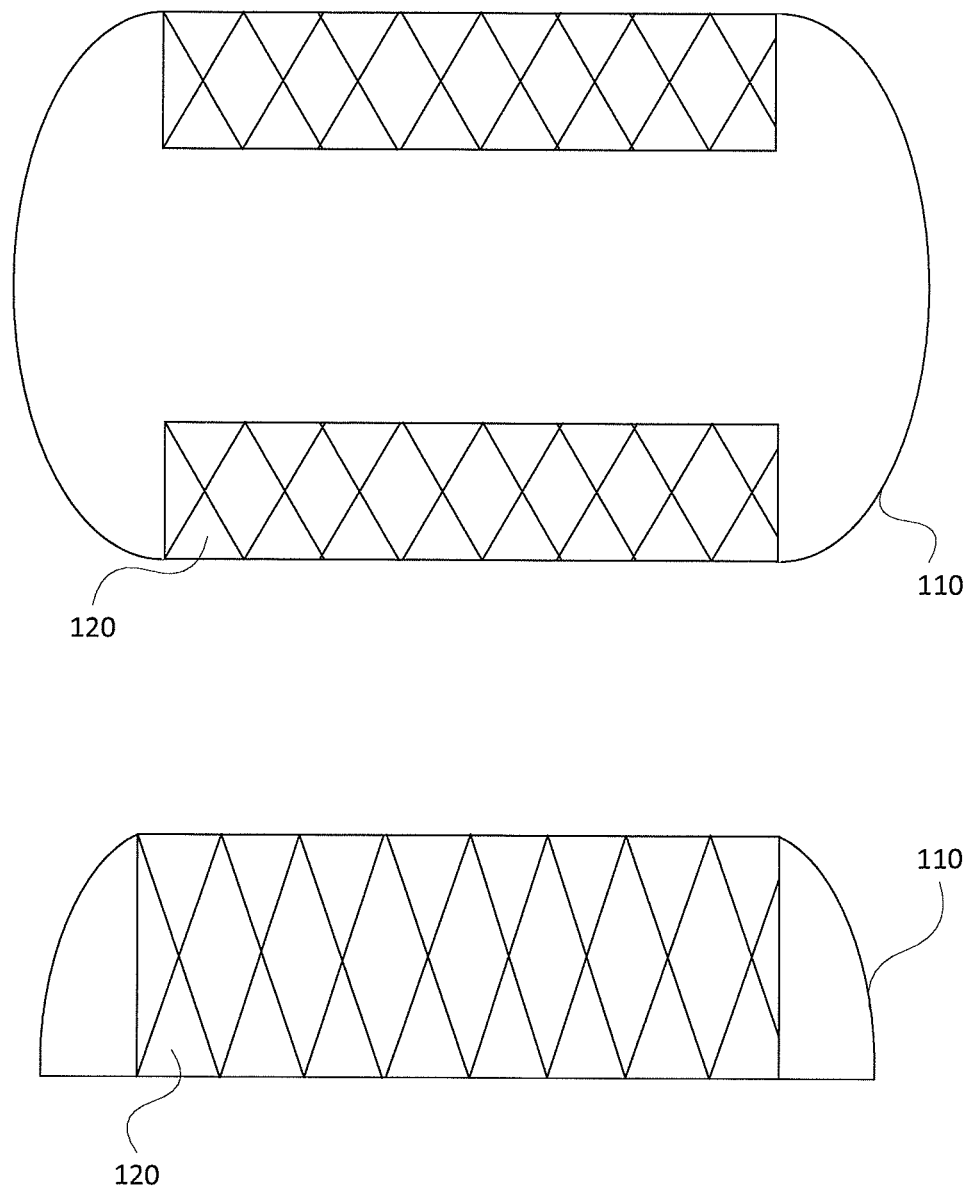
FIG. 1 illustrates a small cell data expansion reflector (DER) according to embodiments of the present disclosure.

FIG. 1 illustrates a small cell-Data Expansion reflector (DER) 100 according to embodiments of the present disclosure. Although certain details will be provided with reference to the components of the DER 100, it should be understood that other embodiments may include more, less, or different components.

The DER 100 is a small cell device configured to provide a wireless communication link between a mobile device and a backhaul network. The DER 100 is adapted to couple to one or more mobile devices to enable the mobile devices to send and receive information, such as data and control signals, to the backhaul network. As such, the DER 100 is configured to provide one or more of: a wireless coverage area; a cellular coverage area; a hotspot, such as a WiFi hotspot; and the like.

The DER 100 can be configured as a street surface reflector (also called a surface marker), such as a road reflector, raised pavement marker, street reflector, road stud, and pavement reflector, used for traffic control and safety. In certain embodiments, the DER 100 with a cylindrical housing is disposed in the road surface such that a highest portion of the housing is substantially flush (i.e., within one centimeter) with the road surface.

The DER 100 includes one or more surfaces that are comprised of a reflective material 120. For example, the DER housing 110 includes a mounting surface, a top surface, and a plurality of side surfaces. In certain embodiments, the surfaces of the reflective material include the plurality of side surfaces, the top surface, or a combination thereof. The DER 100 is made up of a combination of the reflective material, plastic, a ceramic, or other suitable materials. In certain embodiments, only selected ones of the plurality of side surfaces and the top surface include the reflective material. That is, the portions of the DER 100 that are made of the reflective material are less than a whole portion. For example, in the example shown in FIG. 1, two rectangular sides of the DER 100 include the reflective material. In certain embodiments, the DER 100 housing can be in any of a variety of shapes, such as circular, oval, rectangular, octagonal, hexagonal, trapezoidal, or any suitable shape.

Figure 2:
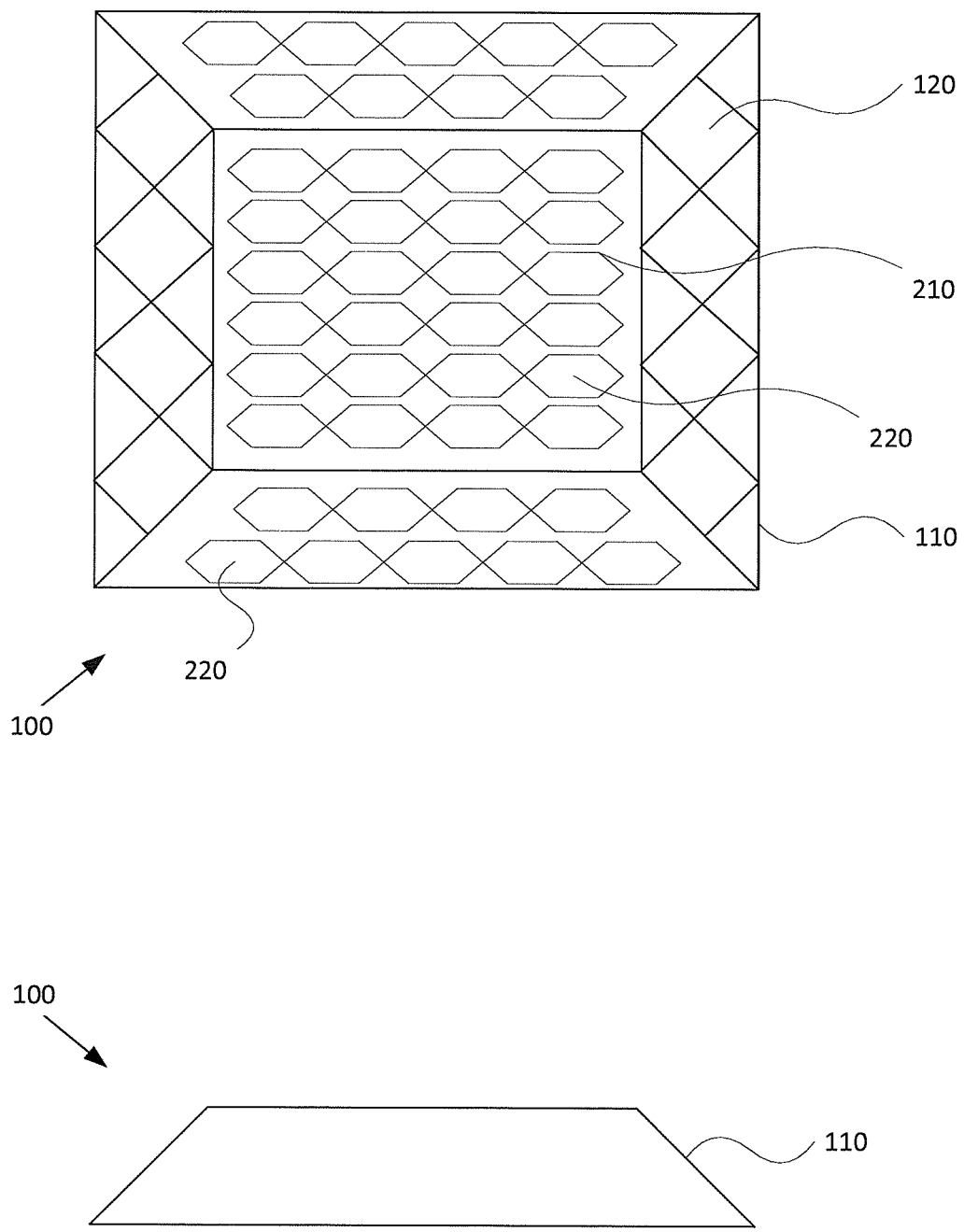
FIG. 2 illustrates a DER that includes a solar array panel according to embodiments of the present disclosure.

FIG. 2 illustrates a DER 100 that includes a solar array panel 210 according to embodiments of the present disclosure. Although certain details will be provided with reference to the components of the DER 100, it should be understood that other embodiments may include more, less, or different components.

In certain embodiments, the DER 100 includes a self-sustaining power source or power supply. In certain embodiments, at least one surface, such as the top surface, is comprised of the self-sustaining power source. The self-sustaining power source can include solar cells 220 (e.g., forming a solar array panel) that include a plurality of photovoltaic cells. In certain embodiments, the DER 100 includes a power interface configured to couple to a self-sustaining power source, such as a solar cell 220. In certain embodiments, the power interface is configured to removably couple to the self-sustaining power source.

In certain embodiments, the DER 100 includes a housing that is a truncated pyramid shape. The solar array panel 210 can be disposed atop the housing 110. One or more sides of the housing can include the solar cells 220. Reflective material 120 is disposed on one or more remaining sides of the housing 110. The sides of the housing 110 that include the solar cells 220 can be oriented to correspond to the sides that allow the greatest amount of solar energy to be absorbed throughout a day and a year. In certain embodiments, the housing includes a clear protective cover disposed over or around the solar array panel 210. The clear protective cover is comprised of any suitable clear material such as a PLEXIGLAS material or other hard plastic, glass or composite material. In certain embodiments, the clear material is comprised of a reflective material and configured as a portion of the reflective surfaces. In certain embodiments, the solar array panel 210 is embedded into the reflective surface or disposed beneath the clear material as a reflective surface.

Figure 3:
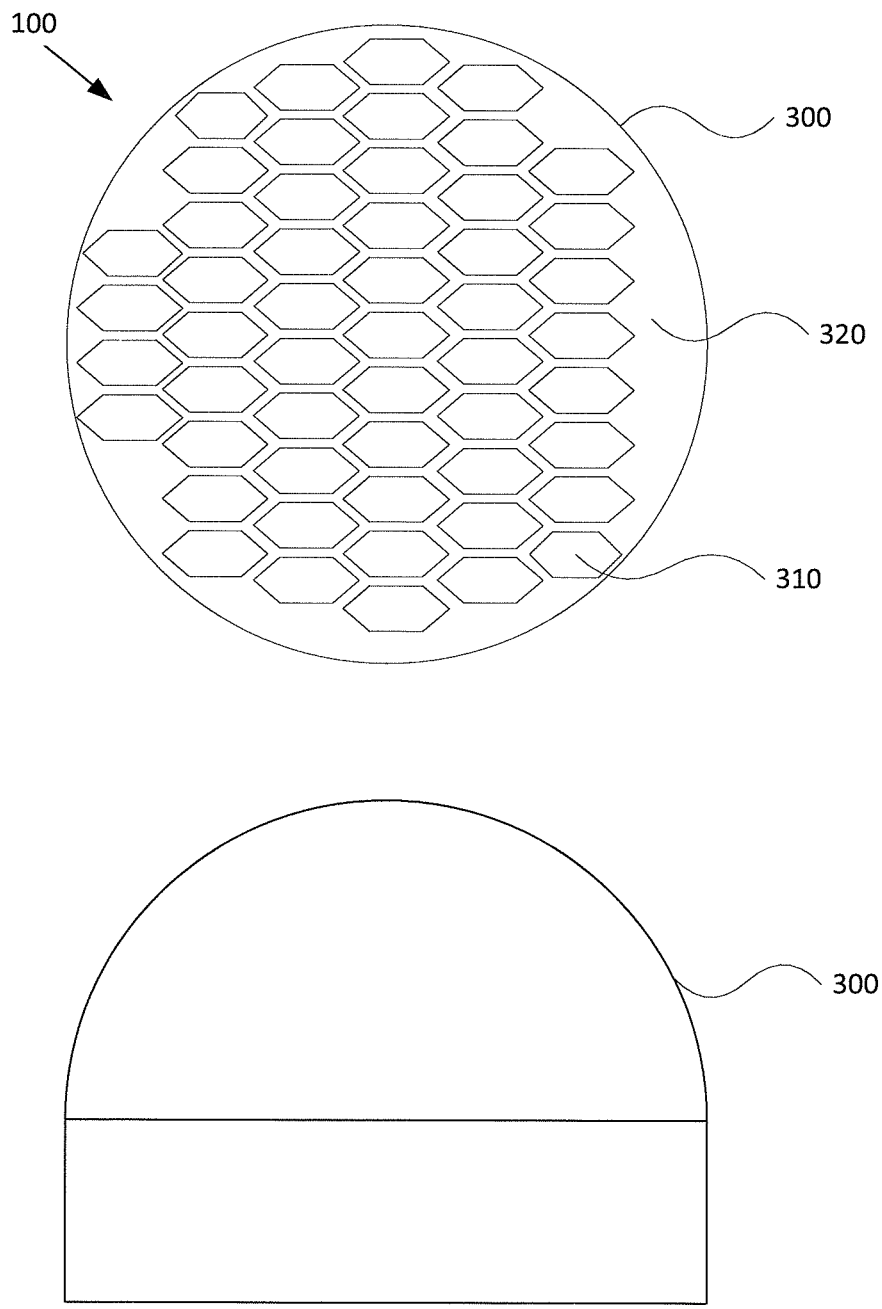
FIG. 3 illustrates a DER with a cylindrical housing according to embodiments of the present disclosure.

FIG. 3 illustrates a DER 100 with a cylindrical housing 300 according to embodiments of the present disclosure. Although certain details will be provided with reference to the components of the DER 100, it should be understood that other embodiments may include more, less, or different components.

The DER 100 with a cylindrical housing 300 that has at least one reflective surface. In certain embodiments, the DER 100 with a cylindrical housing 300 includes a solar array panel 310 disposed atop the reflective surface or disposed beneath a clear reflective surface. The housing 300 can be a truncated sphere atop a cylinder shape. In certain embodiments, the solar array panel 310 is embedded or cut into the reflective surface. In certain embodiments, the DER 100 with a cylindrical housing 300 is disposed in the road surface such that a highest portion of the housing 300 is substantially flush (i.e., within one centimeter) with the road surface.

In certain embodiments, a portion of the DER 100 with a cylindrical housing 300 includes a reflective surface. In certain embodiments, a portion of the DER 100 with a cylindrical housing 300 includes a solar array 310. In certain embodiments, a portion of the DER 100 with a cylindrical housing 300 includes a reflective material and a separate portion of the reflector 100 includes a reflective surface. In certain embodiments, the DER 100 with a cylindrical housing 300 includes a solar array 310 that is also a reflective surface.

Figure 4:
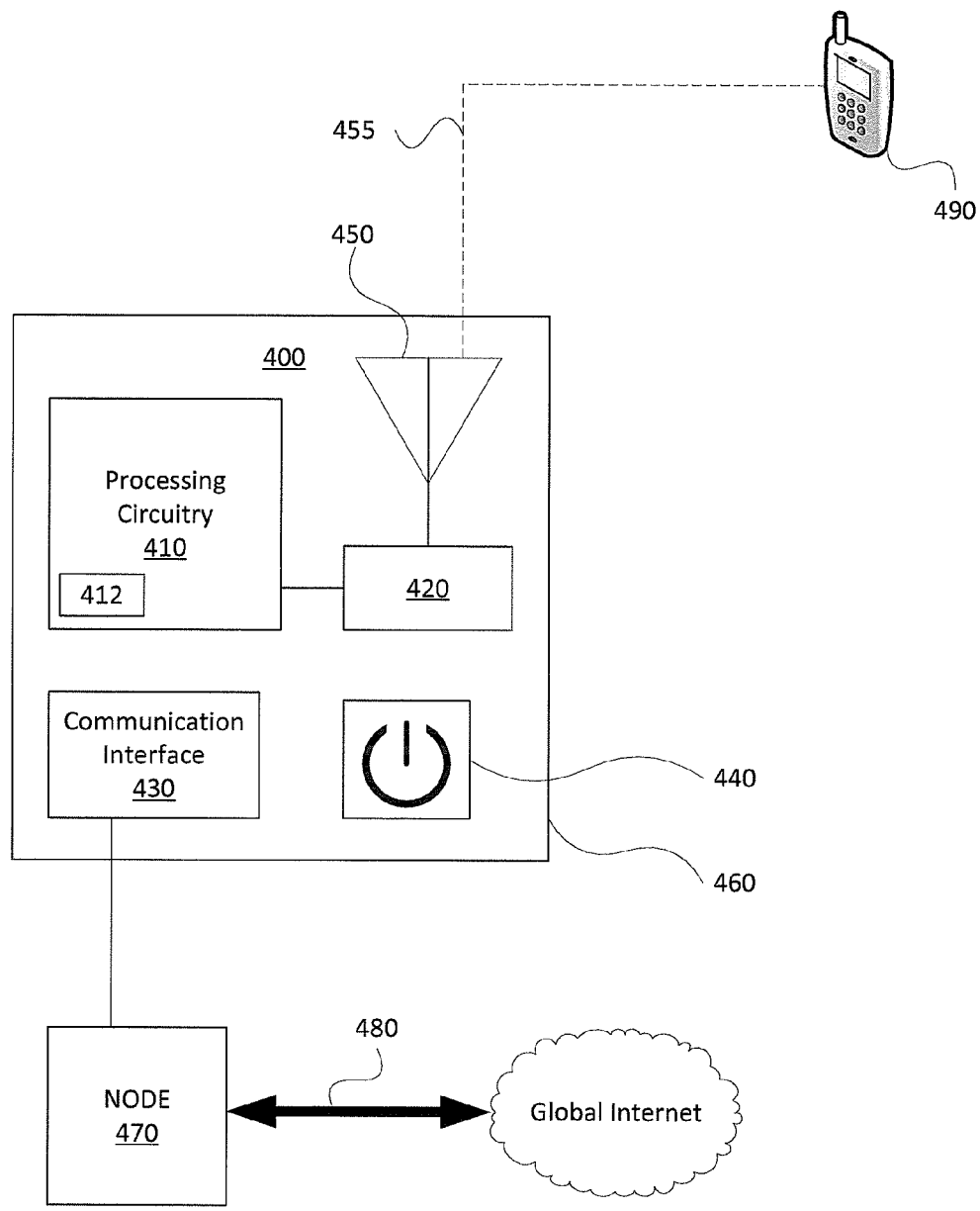
FIG. 4 illustrates selected electrical and electronic components of a control system inside a DER according to embodiments of the present disclosure.

FIG. 4 illustrates components of a control system 400 inside a DER 100 according to embodiments of the present disclosure. Although certain details will be provided with reference to the components of the control system 400, it should be understood that other embodiments may include more, less, or different components. The DER 100 includes the control system 400. The control system 400 is configured to enable the DER 100 to provide access to broadband data services for mobile terminals. The control system 400 includes processing circuitry 410, a transceiver 420, a communication interface 430, a power source 440, and an antenna 450. The housing 460 is configured to contain the control system 400. In certain embodiments, the control system 400 also includes a network node 470. The network node 470 operates as an access point, providing features such as access control, theft prevention, data traffic monitoring, data traffic shaping, network node to network node signaling, and various other features associated with network access and control.

The processing circuitry 410 is coupled to a transceiver 420, a communication interface 430, and a power source 440. The processing circuitry 410 is configured to establish a communication with at least one mobile terminal 490 through a coupling with the transceiver 420. The processing circuitry 410, communicably coupled to the mobile terminal 490, enables communications between the mobile terminal 490 and the Internet (namely, a world-wide-web; a world-wide-network) or a private network. The processing circuitry 410 forms one or more communication channels to communicate information between the mobile terminal 490 and the Internet.

In certain embodiments, the processing circuitry 410 includes a programmable controller. The programmable controller is configured to be reprogrammable to control one or more functions of the processing circuitry, at a later date. In certain embodiments, the programmable controller is configured (such as pre-configured) to control one or more functions of the processing circuitry 410. In certain embodiments, the processing circuitry 410 is embodied as a programmable controller. In the present disclosure, any description of a function or coupling of the processing circuitry 410 is understood to be a function or coupling of the programmable controller.

In certain embodiments, the processing circuitry 410 includes a memory 412. The memory 412 includes any suitable volatile or non-volatile storage and retrieval device(s). For example, the memory 412 can include any electronic, magnetic, electromagnetic, optical, electro-optical, electro-mechanical, or other physical device that can contain, store, communicate, propagate, or transmit information. The memory 412 stores data and instructions for use by the processor or programmable controller of the processing circuitry 410. In certain embodiments, the memory 412 stores location information. For example, the memory 412 is programmed to store a location of the DER 100, such as a global positioning system (GPS) location or a location provide by the network. For example, the network or and operator can program the DER 100 with a geographic location at the time of installation of the DER 100. In certain embodiments, in response to receiving a signal indicating the location of the DER 100, the processing circuitry 410 stores the location in the memory 412.

The control system 400 includes a transceiver 420. The transceiver 420 is configured to transmit data and to receive data. In certain embodiments, the transceiver 420 is a wireless transceiver, for example a WiFi transceiver. In certain embodiments, the transceiver 420 includes an antenna 450. The antenna 450 is configured to enable the transceiver 420 to send data to mobile terminal 490 and to receive data from the mobile terminal 490. In certain embodiments, the transceiver 420 is coupled to antenna 450, enabling the transceiver to send data to a mobile terminal 490 and to receive data from the mobile terminal 490. The transceiver 420 communicates data between the processing circuitry 410 and the mobile terminal 490. That is, the transceiver 420 receives data from the processing circuitry 410 and transmits the data received from the processing circuitry 410 to the mobile terminal 490. The transceiver 420 also receives data from the mobile terminal 490 and transmits the data received from the mobile terminal 490 to the processing circuitry 410. The processing circuitry 410 is communicably coupled to the network node 470. The processing circuitry 410 sends signals to the node 470 and receives signals from the node 470. For example, in response to a signal sent from the processing circuitry 410 to the node 470, the processing circuitry 410 receives one or more signals from the node 470. The processing circuitry 410 sends communications to the Internet and receives communications from the Internet via the node 470. When the processing circuitry 410 is communicably coupled to the Internet, the processing circuitry 410 is configured to enable the mobile terminal 490 to communicate with the Internet via the transceiver 420 and the node 470.

The control system 400 includes a communication interface 430. The communication interface 430 enables communications with one or more of: the processing circuitry 410, a node 470, the backhaul network 480, one or a plurality of mobile terminals 490, and the Internet. Communications can be through a wireless data transfer communication, a wireless local area network (WLAN) Internet communication, an optic communication medium, infrared communication medium, or through wireless-fidelity (WiFi) communication.

The power source 440 is configured to provide power to the control system 400. The power source 440 is coupled to each electrical component of the control system 400. The power source 440 can be directly coupled to each electrical component of the control system 400. In certain embodiments, the power source is directly coupled to the processing circuitry 410, enabling each electrical component coupled to the processing circuitry 410 to indirectly receive power from the power source 440. The power source 440 can be a renewable energy source, such as solar energy, wind energy, geothermal energy, biomass energy, or any combination thereof. For example, the power source 440 can include a connection with a local utility company's distribution system, or an off-the-grid island distribution system, or a combination thereof. In certain embodiments, the power source 440 is a solar array panel 210, 310. In certain embodiments, the power source 440 is a photovoltaic source embodied as photovoltaic paint or another suitable material configured to convert solar energy into electrical energy. In particular embodiments, the power source 440 includes a port or power interface adapted to couple an external power source, which is outside the DER 100 and provides power to the control system 400. In certain embodiments, the port or power interface is configured to removably couple to the external power source. In certain embodiments, the power source 440 includes one or more of the following: a solar-charging battery; a conductor transmitting electricity generated from solar energy; a number of solar cells; a number of solar cells disposed beneath a clear (e.g., PLEXIGLASS) cover of the housing; and a painted stripe on the road or pedestrian walk-way surface. In certain embodiments, a portion of the painted stripe is disposed within or beneath the housing 460.

The antenna 450 is configured to communicably couple to the mobile terminal 490. The antenna 450 can be configured to communicate with the mobile terminal 490 using a suitable wireless communication, such as a WiFi (namely, IEEE 802.11x) communication, a near field communication (NFC), a BLUETOOTH low energy (BLE) communication, a general packet radio service (GPRS) for global system for mobile communications (GSM), an Enhanced Data rages for GSM Evolution (EDGE) communication, a third generation (3G) Universal Mobile Telecommunications System (UMTS) communication, 3G High Speed Packet Access (HSPA) communication, a 3G High Speed Downlink Packet Access (HS-DPA) communication, a Worldwide Interoperability for Microwave Access (WiMax) communication, a fourth generation (4G) Long Term Evolution (LTE) communication, or any other suitable wireless communications protocol. In certain embodiments, the antenna 450 is included in the transceiver 420. In certain embodiments, the antenna 450 is coupled to the transceiver 420. The antenna 450 can be configured with omni-directional characteristics, or uni-directional characteristics. Additionally, the antenna 450 can be a directional antenna configured to communicate data in particular directions.

In certain embodiments, the control system 400 is included in housing 460. The housing 460 can be embodied as a raised reflective surface. Some examples of raised reflective surfaces include: a road reflector, raised pavement marker, street reflector, road stud, and pavement reflector, used for traffic control and safety. The housing 460 can be rectangular, cylindrical, oval, trapezoidal or any suitable shape. In certain embodiments, the housing 460 is dimensioned not to exceed (e.g., be equal in size or smaller than) four inches by four inches wide and two and a quarter inches high (4"×4"×2.25"). For example, when in a truncated sphere configuration, the housing 460 can be dimensioned to include a four inch (4")

diameter and a height of two and a quarter inches (2.25"). The housing 460 is configured to contain the transceiver 420 and the processing circuitry 410. In certain embodiments, the housing 460 is configured to contain at least a portion of the power source 440. In certain embodiments, the housing 460 is configured to contain the entire control system 440.

In certain embodiments, the network node 470 is communicably coupled to a backhaul network 480 (for example, a private or 3$^{rd}$ Party telecommunication network). The network node 470 sends signals to and receives signals from the backhaul network 480. Through the backhaul network, the network node 470 sends signals to and receives signals from the Internet. In certain embodiments, the control system 400 includes the network node 470. In certain embodiments, the control system 400 is communicably coupled to the network node 470. The network node 470 is configured to enable the control system 400, and respective components therein, to communicate via the network node 470 to one or more of the backhaul network 480 and the Internet. The network node 470 is configured to be connected to or communicably coupled (for example, logically coupled) with one or more other nodes of other control systems 400, such as of different DERs. Accordingly, through the network node 470, the control system 400 of a first DER is configured to enable a second DER to be indirectly and communicably coupled to the backhaul network 480 and the Internet. That is, the second DER 100 is configured to couple to one or more of the backhaul network 480 and the Internet via the first DER 100. In certain embodiments, the network node 470 is configured to communicate to the backhaul network 480 using Ethernet, fiber, wireless communication, or any form of Local Area Network, or Wide Area Network technology.

The backhaul 480 is communicably coupled to the network node 470 and the Internet, enabling communications between the network node 470 and the Internet. The backhaul network 480 sends signals to and receives signals from the Internet and one or more network nodes 470. The backhaul 480 enables two-way communication between the node 470 and the Internet. The backhaul 480 can be a wired or wireless network.

The control system 400 is configured to communicate with a number of mobile terminals 490. The control system 400 sends signals to and receives signals from the mobile device 490 via a link 455. The mobile terminal 490 can be a portable computer, a "smart phone", personal data assistant, a touchscreen tablet, an electronic wallet, a vehicle or the like.

Figure 5:
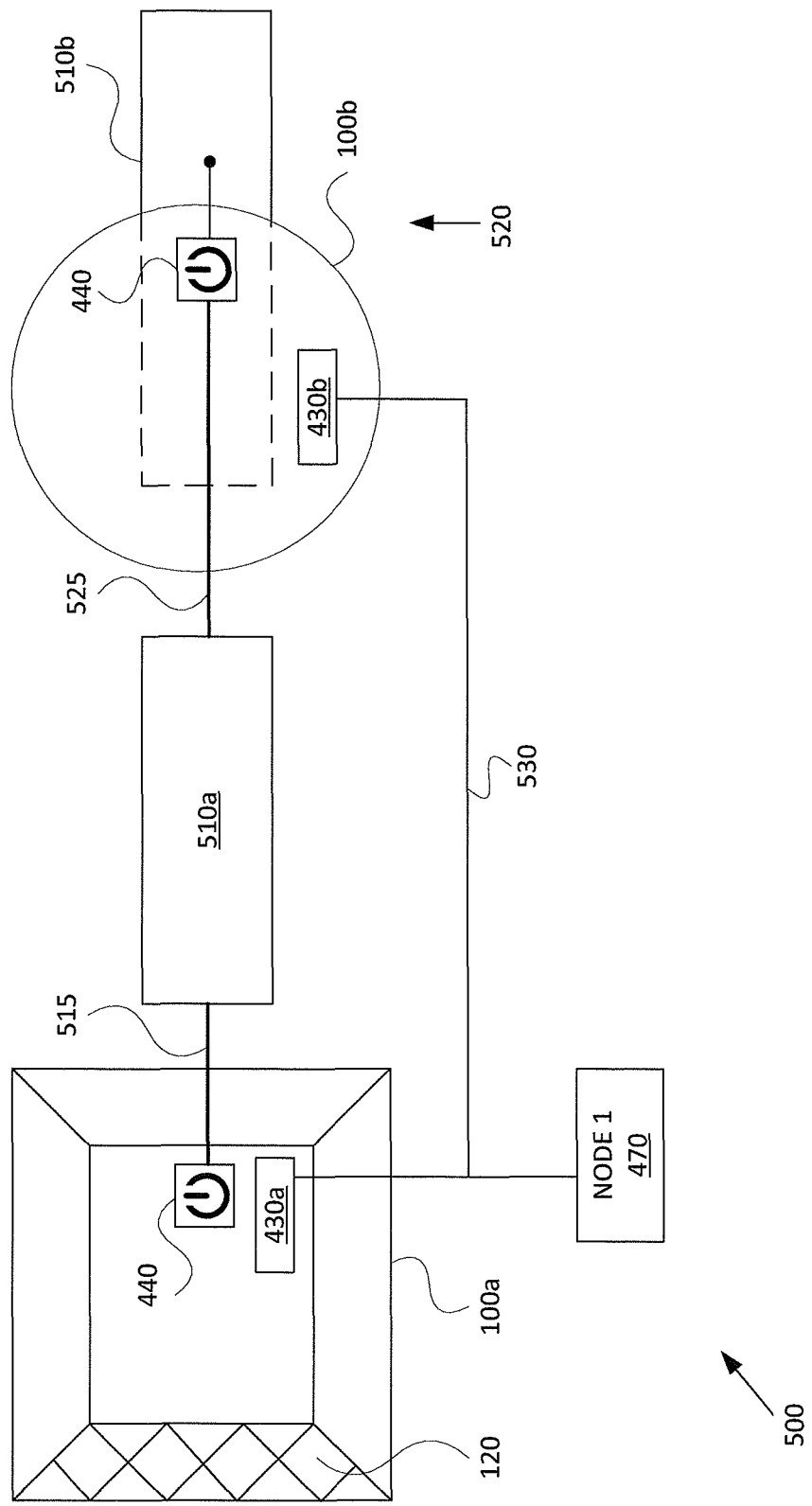
FIG. 5 illustrates a string of DERs according to embodiments of the present disclosure.

FIG. 5 illustrates a string of DERs 500 according to embodiments of the present disclosure. Although certain details will be provided with reference to the components of the string of DERs 500, it should be understood that other embodiments may include more, less, or different components. The string of DERs 500 includes a number of DERs, such as DERs 100a and 100b. Each of the DERs 100a and 100b contains a control system 400. The DERs 100a and 100b are communicably coupled to a common node, such as network node 470, thereby establishing an interlinked string of DERs 500. As described in further detail below, a set of surface reflectors 500 may include various embodiments of DERs and DER assemblies as well as various quantities of the DERs.

DER 100a is embodied as a truncated pyramid pavement marker having reflective material on at least one side. The DER 100a includes a power source 440 configured as a port connected to an external power source 510a via a conductor 515. In certain embodiments, the external power source 510a and 510b is embodied as one or more of: a lane marker; pedestrian marker; or other road or pedestrian way markings. The solar power panels 510a and 510b include a photovoltaic material that converts solar light or solar energy into electricity. For example, the external power source 510a and 510b includes a plurality of photovoltaic cells configured to convert solar energy into electrical energy, such as a plurality of solar cells or a solar power panel. The conductor 515 can be any suitable conductor. The DER 100a includes a communication interface 430 that is coupled to the external network node 470. The connection between the communication interface 430 and the external network node 470 may be on the surface or below the surface of the object to which the DER 100 is attached.

The DER 100b and the solar power panel 510b together form a DER assembly 520. The DER assembly 520 includes a plurality of power sources 440 and 510b.

The DER 100b is embodied as a truncated sphere pavement marker having a reflective material disposed on the entire surface. The DER 100b includes a power source 440 configured as a power port or power interface. The power port or power interface 440 is adapted to connect to a plurality of different power sources (510b, 510a). In certain embodiments, as illustrated in FIG. 5, a portion the solar power panel 510b is disposed beneath, or otherwise in physical contact with, the housing 460, and another portion is disposed outside the housing 460. In certain embodiments, the DER assembly 520 does not include a portion of the external power source (e.g., solar power panel) 510b contained within the housing 460.

The DER 100b includes communication interface 430b. The communication interface 430b of DER 100b is coupled to (e.g., in data communication with) the communication interface 430a of DER 100a, which is connected to a node 470. Where one of the communication interfaces 430a and 430b is connected to the network node 470. The connection between the communication interfaces 430a and 430b of the DERs 100a and 100b, forms a daisy chain 530. In certain embodiments, the daisy chain 530 is a logical daisy chain. The daisy chain 530 enables a communication interface 430b that is not directly connected to the network node 470 to connect to the node 470 via the connection to a communication interface 430 of the first DER 100a, which is coupled to the network node 470. The daisy chain 530 may extend by connecting a subsequent DER 100c to one of the communication interfaces 430b and 430a of either the surface reflector 100b or the surface reflector 100a.

Figure 6:
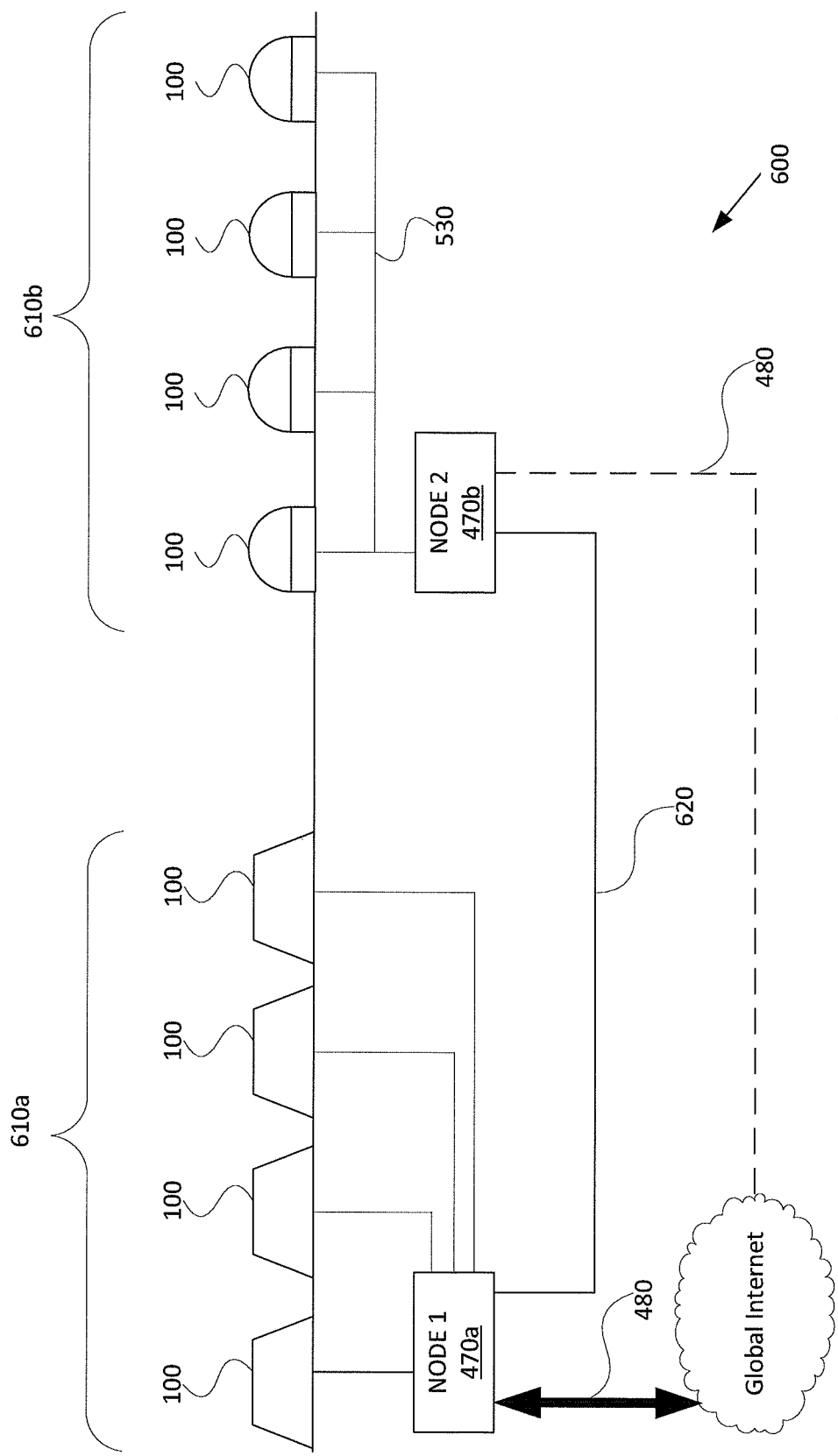
FIG. 6 illustrates a network of DERs according to embodiments of the present disclosure.

FIG. 6 illustrates a network of DERs according to embodiments of the present disclosure. The embodiment of the DER network 600 shown in FIG. 6 is for illustration only. Other embodiments could be used without departing from the scope of this disclosure. Although in FIG. 6, each set of DERs 610 includes four surface reflectors, a set of DERs 610 can include any number of DERs.

The network of DERs 600 includes a plurality of sets of DERs. For example, the network of DERs 600 includes a first set of DERs 610a and a second set of DERs 610b. Network node 470b of a second set of DERs 610b is connected to network node 470a of a first set of DERs 610a. In certain embodiments, the network nod 470b is logically connected to network node 470a. The first set of DERs 610a is connected to the backhaul network 480. The connection 620 between the network nodes 470a and 470b, in which one of the first network nodes 470a is connected to the backhaul 480, forms a daisy chain 620 of nodes. The daisy chain 620 enables network node 470b to connect to the backhaul 480 via the connection to the network node 470a of the first set of DERs 610a, which is coupled to the backhaul 480 directly (for example, wherein a signal from the network node 470a is not received by an intermediary before the backhaul network receives the signal). In certain embodiments, the daisy chain 620 is a logical daisy chain such that the second network node 470b sends signals to and receives signals from the first network node 470a via the backhaul network 480 and the Internet. The daisy chain 620 can be extended by connecting a subsequent network node 470 of another set of DERs 610 to either the network node 470a or the network node 470b. In certain embodiments of the network of DERs 600, the first network node 470a is connected to the backhaul network 480, and the second network node 470b is directly coupled to the backhaul network 480 independent of the daisy chain 620 connection. In certain embodiments of the network of DERs 600, the first network node 470a is connected to the backhaul network 480, and the second network node 470b is coupled to the backhaul network 480 through one or more of a direct connection independent of the daisy chain 620 and through the first network node 470a via the daisy chain 620. For example, the second set of DERs 610b select to the backhaul network via the independent direct connection to the backhaul network 480 or alternatively via the daisy chain to the first network node 470a. In certain embodiments of the network of DERs 600, the daisy chain is extended by connecting either the network node 470a or the network node 470b to a third network node 470 (of a third set of DERs 610) that is directly connected to the backhaul network 480. In certain embodiments, when a plurality of network nodes 470a and 470b have established a communication (such as a channel of communication) with the Internet, each network node 470 sends signals to and receives signals from the other network nodes 470. For example, the first network node 470a sends signals to and receives signals from the second network node 470b via one or more of the backhaul network 480 and the Internet.

The set of DERs 610a includes truncated pyramid shaped surface reflectors. Each DER of 610a includes a communication interface 430 that is coupled to the network node 470a. The second set of DERs 610b includes truncated sphere shaped DERs. Each DER of the set 610b includes a communication interface 430 coupled to the communication interface 430 of an adjacent DER, creating a daisy chain to the communication interface 430 that is coupled to the network node 470b. In certain embodiments, the coupling is a logical daisy chain between a first communication interface 430 of a DER of the set 610b and a second communication interface 430 of a second DER of the set 610b that is coupled to the network node 470b.

Figure 7:
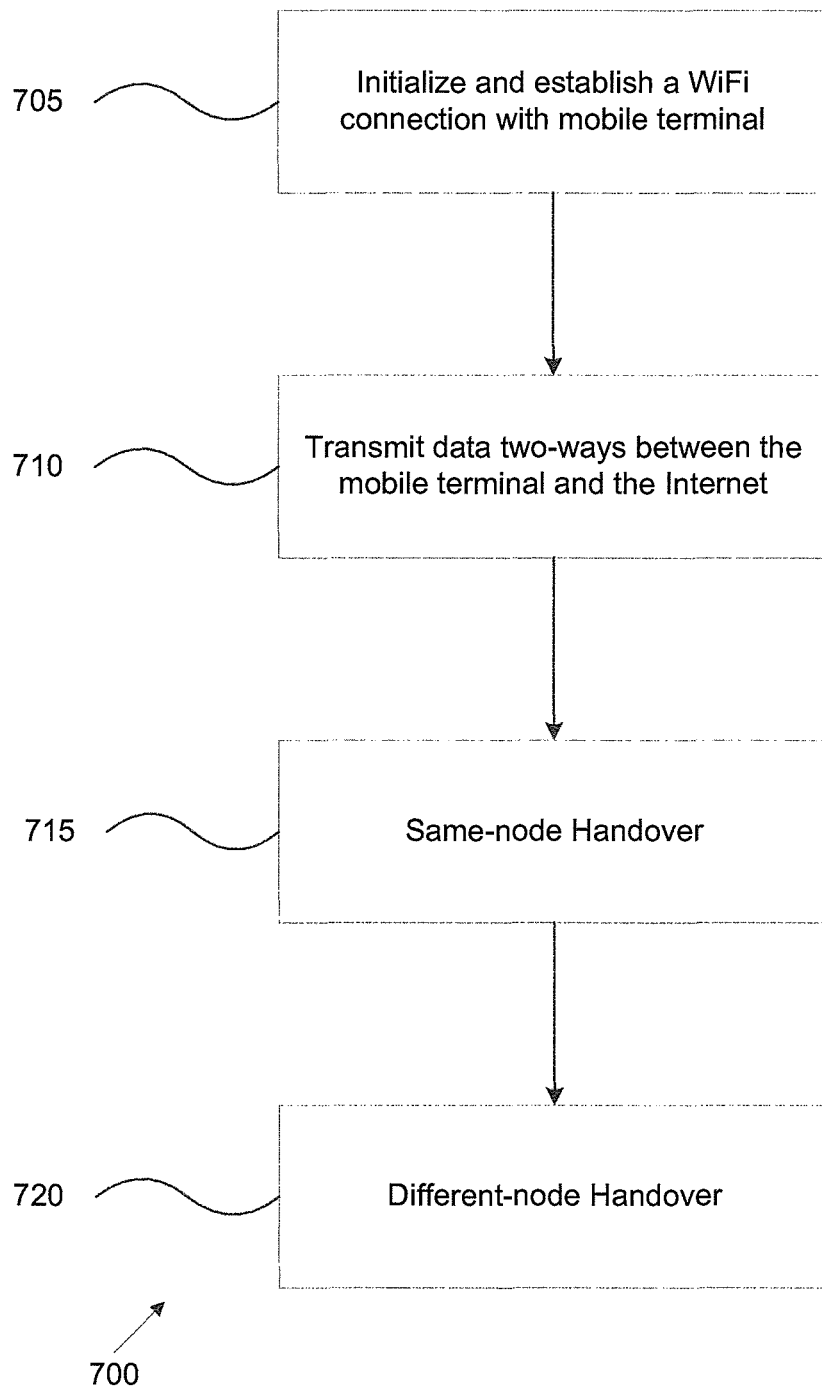
FIG. 7 illustrates a process for providing mobile broadband data access according to embodiments of the present disclosure.

FIG. 7 illustrates a process for providing mobile broadband data access according to embodiments of the present disclosure. The embodiment of the process 700 shown in FIG. 7 is for illustration only. Other embodiments could be used without departing from the scope of this disclosure.

The process 700 can be performed, for example, by one or more control systems 400, hereinafter referred to in the singular as "the system." The process 700 can be implemented by executable instructions stored in a non-transitory computer-readable medium that cause one or more surface reflector control systems 400 to perform such a process.

In block 705, when a mobile terminal 490 is within a range close enough to communicably couple to at least one control system 400 of a surface reflector, the processing circuitry 410 is within a communicable coupling range and will initialize and establish a wireless connection with the mobile terminal 490. The processing circuitry 410 is configured to determine when the mobile terminal 490 is within a communicable coupling range, such as based in part on the strength of the signal between the mobile terminal 490 and the antenna 450.

In block 710, once a mobile terminal 490 is communicably coupled to at least one DER 100, the DER 100 transmits data back and forth between the mobile terminal 490 and the Internet. The data communication path includes the mobile terminal 490, the antenna 450, the transceiver 420, the processing circuitry 410, the communication interface 430, the node 470, the backhaul 480, and the Internet.

In block 715, as the mobile terminal 490 moves, the mobile terminal 490 moves out of a communicable coupling range of a first DER to which the mobile terminal 490 is connected. The mobile terminal 490 moves into a communicable coupling range of a second DER that belongs to the same set 610 of DERs as the first surface reflector. In certain embodiments, the second DER initiates and establishes a wireless connection with the mobile terminal 490. In response to the establishment a connection of the mobile terminal 490 to the second DER, the first DER terminates the data connection to the mobile terminal 490. This process is referred to as a same-node handover.

In certain embodiments, the processing circuitry 410 is configured to perform a different-node handover in block 720. As the mobile terminal 490 continues to move, the mobile terminal 490 moves out of a communicable coupling range with all of the DERs in the first set of DERs that are coupled to the node of the first DER. In the different-node handover 720, in response to the establishment of a connection with a second DER that does not belong to the same set 610 of DERs as the first DER (e.g., not included in the first set of DERs), the first DER terminates the data connection between the mobile terminal 490 and the first DER. In certain embodiments, the different-node handover process is conducted using a hardwire handover in which the first node and second node are communicably coupled via a wired connection. In certain embodiments, the different-node handover process is conducted using a wireless handover—in which the first node and second node are communicably coupled via a wireless connection. In certain embodiments, one or more of the same node handovers and different node handovers are controlled by a central switch. In certain embodiments, one or more of the same node handovers and different node handovers are controlled by one of the network nodes 470. In certain embodiments, one or more of the same node handover and different node handover are controlled in part by the mobile terminal. In certain embodiments, one or more of the same node handover and different node handover are controlled by one or more components in the backhaul network 480.

Figure 8:
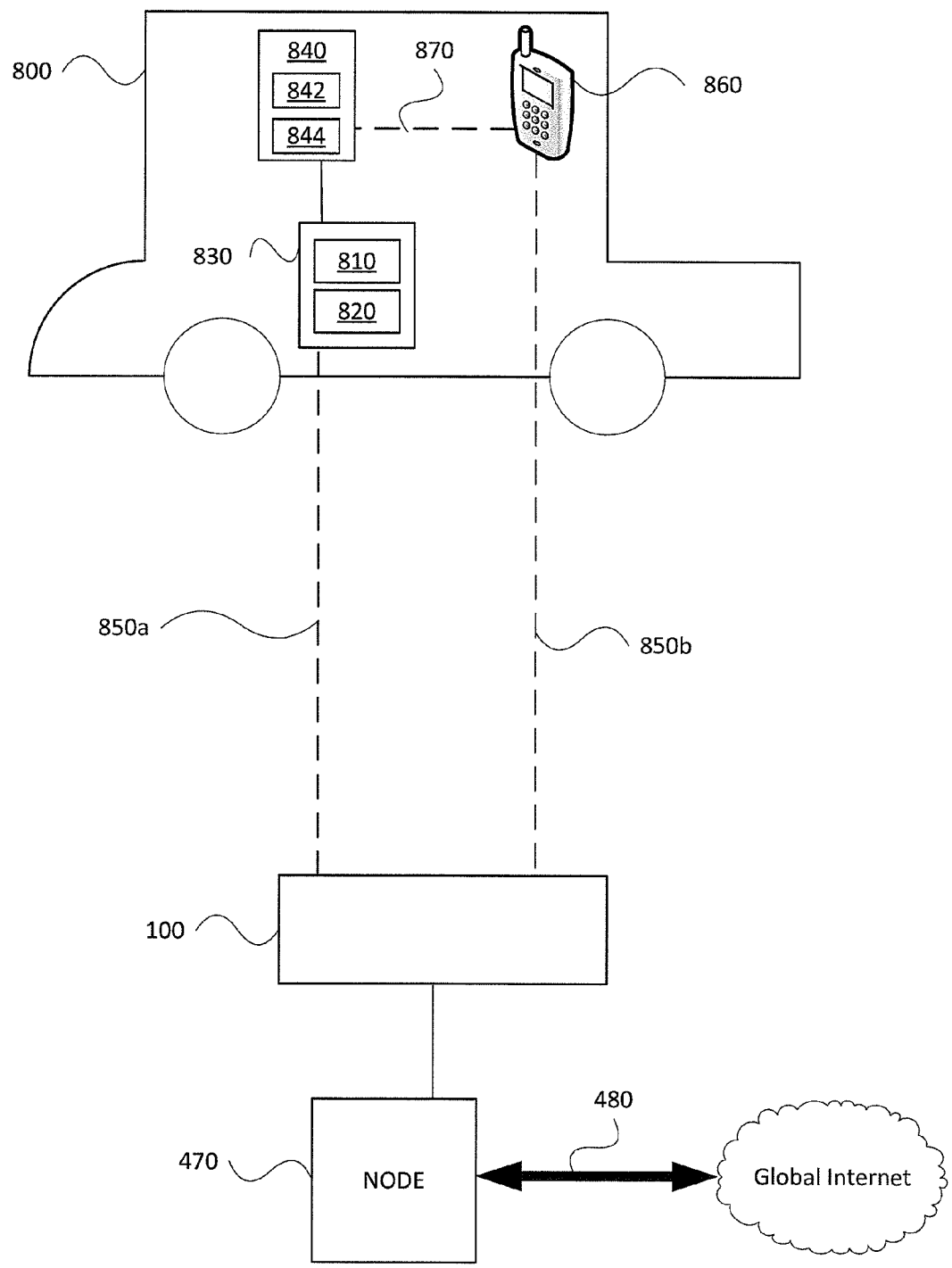
FIG. 8 illustrates a DER providing mobile broadband access according to embodiments of the present disclosure.

FIG. 8 illustrates a DER 100 providing mobile broadband access to a vehicle 800 according to embodiments of the present disclosure. In certain embodiments, the mobile terminal 490 is a vehicle 800 (e.g., car; truck; van; bus) that includes an antenna 810 adapted to receive wireless data signals from one or more DERs 100. The control system 400 of the DER 100 sends signals to and receives signals from the vehicle 800 via a link 850a.

The vehicle 800 includes a transmitter 820 to send wireless data signals to one of more DERs 100. In certain embodiments, the vehicle's antenna 810 and transmitter 820 (together "vehicle transceiver" 830) are located physically close to the ground, such as at or near the bottom of the vehicle, under the passenger cabin. When the DER 100 is located on the street and the vehicle transceiver 830 is disposed under the vehicle, the vehicle can receive a stronger signal link 850a from the DER 100 as compared with the strength of the signal link 850b to the mobile terminal 860 within the passenger cabin. In certain embodiments, the vehicle's antenna 810 positioned on the vehicle in any one or more of: atop, on a side, internally, externally, beneath, the so forth, to enhance transmission and reception of signals between the antenna 810 and the DER 100.

In certain embodiments, the antenna 810 is coupled to a control unit located in the vehicle 800. The vehicle's control unit 840 includes processing circuitry, a memory 842, and an interface 844 to link 870 to a mobile terminal 860 within the passenger cabin of the vehicle. The link 870 can be a wired or wireless link, such as via BLUETOOTH Low Energy, infrared, Universal Serial Bus (USB), or any other suitable data transmission medium link. The control unit 840 is adapted to boost the strength of the signal from the DER 100 to the mobile terminal 860. For example, when the signal strength link 850b (between the DER 100 and the mobile terminal 860 within the passenger cabin of the vehicle) is weak compared to the signal strength of link 850a (between the DER 100 and the vehicle 800), then the DER 100 sends signals to the mobile terminal 860 through the control unit 840 and through the vehicle interface link 870 to the mobile terminal 860.

In certain embodiments, the control unit 840 includes a memory 842 adapted to buffer data transferred from the Internet to the mobile device 860. The control unit 840 monitors a transfer of data from the Internet to the memory of the mobile terminal 860. In the event a connection between the mobile terminal 860 and the control unit 840 is lost or severed during a download of a file from the Internet, the control unit 840 continues to download data from the internet via the connection 850a between the control unit 840 and the DER 100. The control unit 840 stores the download data in the memory 842 for retrieval by the mobile terminal 860. Upon a re-connection between the mobile terminal 860 and the controller 840, the downloaded data stored in the memory 842 is transferred to the mobile terminal 860.

As an illustrative and non-limiting example: a user commences downloading a movie. During the download of the movie, the user exits the vehicle 800 along with the mobile terminal 860, thus severing the connection between the mobile terminal 860 and the control unit 840. Thereafter, the control unit 840 continues to download and store the remaining portion of the movie. When the user returns to the vehicle and re-connects the mobile terminal 860 to the control unit 840 via the interface 844, the remaining portion of the movie is downloaded to the mobile terminal. The mobile terminal can prompt the user to request a download of the buffered data after the marker. Alternatively, in response to a re-establishment of the link 870, the controller 840 can initiate the download of the buffered data without user interaction. Therefore, the user is able to complete the download without being required to re-start the entire download.

In certain embodiments, the control unit 840 stores a file marker indicating when the download was interrupted. The control unit 840 stores a first file marker in the memory 842. The file marker identifies the portion (transferred portion) of the file that has been transferred to the memory of the mobile terminal 860 and the portion (un-transferred portion) of the file that has not been transferred to the memory of the mobile terminal 860. If before the entire file is transferred to the memory of the mobile terminal 860, the user removes the mobile terminal 860 from the vehicle 800 or otherwise disconnects the mobile terminal 860 from interface link 870, then the control unit 840 will continue to download the un-transferred portion and store or buffer the un-transferred portion in the memory 842 of the control unit 840. When the mobile terminal 860 re-establishes the link 870 to the control unit 840 through the interface 844, then un-transferred portion of the data is downloaded to the memory of the mobile terminal 860. That is, in response to a reconnection of the mobile terminal 860 with the control unit 840, the download is re-initiated at the point indicated by the marker. The mobile terminal can prompt the user to request a download of the un-transferred portion of the data after the marker. Alternatively, in response to a re-establishment of the link 870, the controller 840 can initiate the download of the un-transferred data after the marker without user interaction. In both cases, however, the data downloaded prior to the marker is not required to be downloaded again.

Although various features have been shown in the figures and described above, various changes may be made to the figures. For example, the size, shape, arrangement, and layout of components shown in FIGS. 1 through 6 and 8 are for illustration only. Each component could have any suitable size, shape, and dimensions, and multiple components could have any suitable arrangement and layout. Also, various components in FIGS. 1 through 6 could be combined, further subdivided, or omitted and additional components could be added according to particular needs. For instance, a system using GTDs could support only cellular or satellite communications. Further, each component in a device or system could be implemented using any suitable structure(s) for performing the described function(s). In addition, while FIG. 7 illustrates various series of steps, various steps in FIG. 7 could overlap, occur in parallel, occur multiple times, or occur in a different order.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A data expansion reflector comprising:
a wireless transceiver configured to transmit and receive data;
a processing circuitry configured to:
couple to a backhaul network through a wire line communication link and to at least one mobile terminal through a wireless communication link, and
communicate information between the at least one mobile terminal and the backhaul network;
a power source configured to provide electrical energy to at least one of the processing circuitry and the wireless transceiver; and
a housing comprising a raised pavement marker including a reflective surface, the housing configured to contain the processing circuitry, the wireless transceiver, and the power source.

2. The data expansion reflector of claim 1, wherein the processing circuitry is configured to couple to at least a data expansion reflector.

3. The data expansion reflector of claim 2, wherein the second data expansion reflector is coupled to the backhaul network.

4. The data expansion reflector of claim 3, wherein the processing circuitry is coupled to second data expansion reflector via a logical daisy chain.

5. The data expansion reflector of claim 1, wherein the processing circuitry is further configured to handover the communication with the at least one mobile terminal to a data expansion reflector.

6. The data expansion reflector of claim 1, wherein the power source comprises a port configured to receive electricity from an external power source.

7. The data expansion reflector of claim 1, wherein the power source comprises a converter configured to convert solar energy into electricity and at least one of:
   a solar panel; and
   a photovoltaic painted stripe on a road.

8. The data expansion reflector of claim 1, wherein the power source is configured to use solar energy to charge a solar-charging battery and provide power to operate the wireless transceiver and the processing circuitry.

9. The data expansion reflector of claim 1, wherein the processing circuitry is configured to couple to the at least one mobile terminal via an intermediate control unit.

10. The data expansion reflector of claim 9, wherein the intermediate control unit comprises:
    an interface configured to couple to the mobile terminal; and
    a memory configured to at least one of:
       buffer at least a portion of the information transferred between the backhaul network and the mobile terminal; and
       store a file marker configured to identify a portion of data received from the backhaul network.

11. A system comprising
    a first set of data expansion reflectors, the first set of data expansion reflectors comprising: a plurality of data expansion reflectors configured to couple to a backhaul network, each data expansion reflector comprising:
    a wireless transceiver configured to transmit and receive data;
    a processing circuitry configured to:
       couple to the backhaul network through a wire line communication link and to at least one mobile terminal through a wireless communication link, and
       communicate information between the at least one mobile terminal and the backhaul network;
    a power source configured to provide electrical energy to at least one of the processing circuitry and the wireless transceiver; and
    a housing comprising a raised pavement marker including a reflective surface, the housing configured to contain the processing circuitry, the wireless transceiver, and the power source.

12. The system of claim 11, wherein the first set of data expansion reflector is configured to handover a connection with the at least one user mobile terminal to a second set of surface markers.

13. The system of claim 12, wherein the second set of data expansion reflectors comprises a plurality of surface markers coupled to the backhaul network.

14. The system of claim 13, wherein the second set of data expansion reflectors is coupled to the first set of data expansion reflectors via a logical daisy chain.

15. The system of claim 11, wherein the power source comprises a port configured to receive electricity from an external power source.

16. The system of claim 11, wherein the power source comprises a converter configured to convert solar energy into electricity and at least one of:
    a solar panel; and
    a photovoltaic painted stripe on a road.

17. The system of claim 11, wherein the power source is configured to use solar energy to charge a solar-charging battery and provide power to operate the wireless transceiver and the processing circuitry.

18. A method comprising:
    coupling a data expansion unit to a backhaul network through a wire line communication link;
    coupling at least one mobile terminal to the data expansion unit through a wireless communication link; and
    communicating, by the data expansion unit, information between the at least one mobile terminal and the backhaul network, wherein the data expansion unit comprises a raised pavement marker including a reflective surface.

19. The method of claim 18, further comprising handing over the communication with the at least one mobile terminal to a second data expansion reflector, and
    wherein the mobile terminal comprises an automobile.

20. The method of claim 18, further comprising storing a geographic location of the data expansion unit.

* * * * *